United States Patent
Chang

(10) Patent No.: US 7,163,193 B2
(45) Date of Patent: Jan. 16, 2007

(54) WATER FLOW-CONTROLLING DEVICE FOR A COOLING SYSTEM OF A VEHICLE

(76) Inventor: Yung-Yu Chang, No. 75, Lane 223, Chung-Cheng Rd., Shan-Hua Chen, Tainan Hsien (TW)

( * ) Notice: Subject to any disclaimer, the term of this patent is extended or adjusted under 35 U.S.C. 154(b) by 77 days.

(21) Appl. No.: 11/114,545

(22) Filed: Apr. 26, 2005

(65) Prior Publication Data

US 2006/0237676 A1    Oct. 26, 2006

(51) Int. Cl.
*F16K 31/44* (2006.01)

(52) U.S. Cl. ......................... 251/263; 251/77

(58) Field of Classification Search .............. 251/77, 251/129.11, 251, 262, 263, 321, 323
See application file for complete search history.

(56) References Cited

U.S. PATENT DOCUMENTS 2,391,551 A * 12/1945 Cruzan et al. ......... 137/115.01
3,015,963 A * 1/1962 Terry ........................ 74/44
3,543,777 A * 12/1970 Howes ..................... 137/551

* cited by examiner

*Primary Examiner*—Edward K. Look
*Assistant Examiner*—John K. Fristoe, Jr.
(74) *Attorney, Agent, or Firm*—Jackson Walker, LLP

(57) ABSTRACT

A water flow-controlling device has a tube, a shaft, a block, a washer and a reciprocating assembly. The tube has a front opening, a rear opening, a side opening and a rear bracket. The openings communicate with one another. The rear bracket is mounted in the tube near the rear opening. The shaft is mounted in and is aligning with the tube and is mounted movably in the rear bracket. The block and the washer are mounted on the shaft. The block selectively obstructs the communication between the front and side openings. The reciprocating assembly connects to the shaft to move the shaft to align with the tube. The reciprocating assembly moves the shaft to extend out of the tube or the inner pressure pushes the block to prevent the block from obstructing the communication between the front and side openings.

9 Claims, 2 Drawing Sheets

WATER FLOW-CONTROLLING DEVICE FOR A COOLING SYSTEM OF A VEHICLE

BACKGROUND OF THE INVENTION

1. Field of the Invention

The present invention relates to a cooling system of a vehicle, especially to a water flow-controlling device for a cooling system of a vehicle.

2. Description of the Prior Arts

To keep an engine of a vehicle working normally, the vehicle has a water tank and a cooling system to cool the engine. The conventional cooling system has a flow route, a control device and a temperature sensor. The flow route is configured within and around the engine and connects to the water tank. The control device controls travel of the water from the water tank to along the flow route. The temperature sensor is attached to the engine to measure the temperature of the engine and sends the temperature information to the control device. A standard working temperature range of an engine of a vehicle is set by the producer when the vehicle is produced. When the temperature of the engine is higher than the standard working temperature range, the control device allows the water from the water tank to flow into the flow route to cool the engine. When the temperature of the engine is lower than the standard temperature range, the control device does not allow the water from the water tank to flow into the flow route. However, the standard working temperature range is set when the vehicle is produced, and it is not easy for the user to change the working temperature range. Some countries, such as Canada, have a very wide temperature difference between summer and winter and so the setting range for the thermostat is excessive. To overcome the shortcomings, the present invention provides a water flow-controlling device for a cooling system of a vehicle to mitigate or obviate the aforementioned problems.

SUMMARY OF THE INVENTION

The main objective of the present invention is to provide a water flow-controlling device for use in two ways to start the cooling system to cool the engine of the vehicle. The water flow-controlling device has a tube, a shaft, a block, a washer and a reciprocating assembly. The tube has a front opening, a rear opening, a side opening and a rear bracket. The openings communicate with one another. The rear bracket is mounted in the tube near the rear opening. The shaft is mounted in and is aligning with the tube and is mounted movably in the rear bracket. The block and the washer are mounted on the shaft. The block selectively obstructs the communication between the front and side openings of the tube. The reciprocating assembly connects to the shaft to move the shaft to align with the tube. The reciprocating assembly moves the shaft to extend out of the tube or the inner pressure pushes the block to prevent the block from obstructing the communication between the front and side openings.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
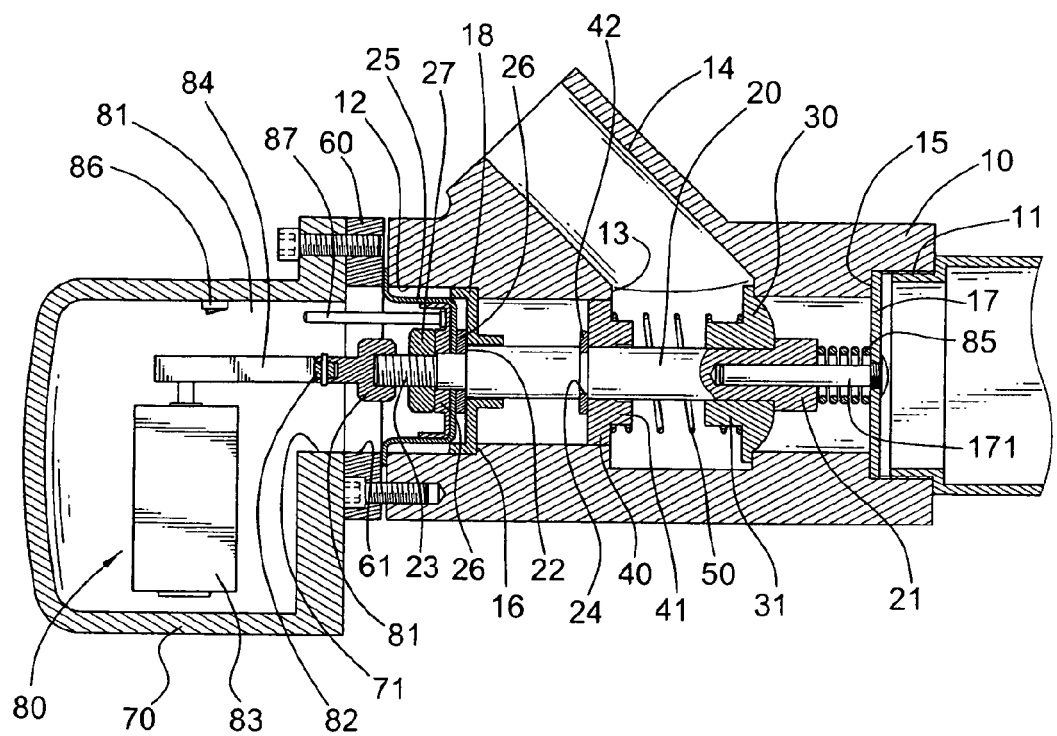
FIG. 1 is a side view in partial section of a water flow-controlling device for a cooling system of a vehicle in accordance with the present invention.

With reference to FIG. 1, a water flow-controlling device for a cooling system of a vehicle in accordance with the present invention is mounted between a water tank and a flow route of the cooling system and comprises a tube (10), a shaft (20), a block (30), a washer (40), a spring (50), a mounting board (60), a case (70) and a reciprocating assembly (80).

The tube (10) has an inner wall, a front opening (11), a rear opening (12), a side opening (13), a branch tube (14), an optional front shoulder (15), an optional rear shoulder (16), a rear bracket (18) and an optional front bracket (17). The front, rear and side openings (11, 12, 13) communicate with one another. The front opening (11) connects to the water tank of the cooling system. The branch tube (14) is formed on the side opening (13) and connects to the flow route of the cooling system. The front shoulder (15) is formed on the inner wall near the front opening (11). The rear shoulder (16) is formed on the inner wall near the rear opening (12). The rear bracket (18) is mounted on the inner wall near the rear opening (12) and may be attached to the rear shoulder (16). The front bracket (17) is mounted on the inner wall near the front opening (11), may be attached to the front shoulder (15) and has a protruding rod (171). The protruding rod (171) is mounted securely in the front bracket (17) and extends toward the rear bracket (18).

The shaft (20) is mounted movably in the rear bracket (18), may be mounted movably around the protruding rod (171) on the front bracket (17) and has an outer wall, a front end, a rear end, a head (21), an optional shoulder (22), an optional thread (23), an optional groove (24), an optional seal (25), an optional clamp assembly (26) and an optional fastener (27). The rear end extends through the rear bracket (18). The head (21) is formed on the front end, may be mounted movably around the protruding rod (171) on the front bracket (17). The shoulder (22) is formed on the shaft (20) near the rear end. The thread (23) is formed on the outer wall. The groove (24) is formed in the outer wall. The seal (25) is mounted on the shaft (20) near the rear end and has two sides and two ends. The two ends of the seal (25) are attached to the rear opening (12) of the tube (10). The clamp assembly (26) is attached to the two sides of the seal to clamp the seal (25). The fastener (27) screws on the thread (23) on the shaft (20) and is attached to the clamp assembly (26) to fasten the clamp assembly (26).

The block (30) is mounted movably on the shaft (20), selectively obstructs the communication between the front opening (11) and the side opening (13) of the tube (10) to stop the water from the water tank flowing into the branch tube (14) and has a front surface, a rear surface and an optional protrusion (31). The front surface abuts the head (21) on the shaft (20). The protrusion (31) is formed on the rear surface.

The washer (40) is mounted securely on the shaft (20) and has a front surface, a rear surface, an optional protrusion (41) and an optional clip (42). The rear surface is adjacent to the groove (24) in the shaft (20). The protrusion (41) is formed on the front surface. The clip (42) engages the groove (24) in the shaft (20) and is attached to the rear surface.

The spring (50) is mounted between the rear surface of the block (30) and the front surface of the washer (40) and may be mounted on the protrusions (31, 41) on the block (30) and the washer (40).

The mounting board (60) is attached to the rear opening (12) of the tube (10), may be attached to the two ends of the seal (25) and has a through hole (61). The through hole (61) is formed through the mounting board (60) and communicates with the rear opening (12) of the tube (10).

The case (70) is hollow, is attached to the mounting board (60) and has a front opening (71). The front opening (71) communicates with the through hole (61) in the mounting board (60).

Figure 2:
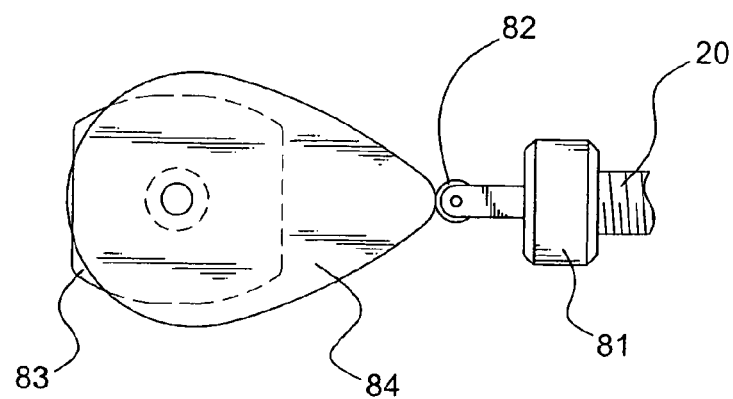
FIG. 2 is a partial enlarged top view of the water flow-controlling device.

With further reference to FIG. 2, the reciprocating assembly (80) is mounted in the case (70), connects to the shaft (20) to move the shaft (20) to align with the tube (10) and may have a connector (81), a roller (82), a motor (83), a cam (84), a spring (85), a switch (86) and a rod (87). The connector (81) is mounted on the rear end of the shaft (20) and extends into the case (70). The roller (82) is mounted rotatably on the connector (81). The motor (83) is mounted in the case (70). The cam (84) connects to and is rotated by the motor (83) and contacts the roller (82). The spring (85) is mounted on and is pressed by the front bracket (17) and the head (21) on the shaft (20) and may be mounted around the protruding rod (171) of the front bracket (17). The switch (86) is attached to the case (70) and is selectively pressed to stop the motor (83). The rod (87) is attached to the seal (25) and selectively presses the switch (86).

Figure 3:
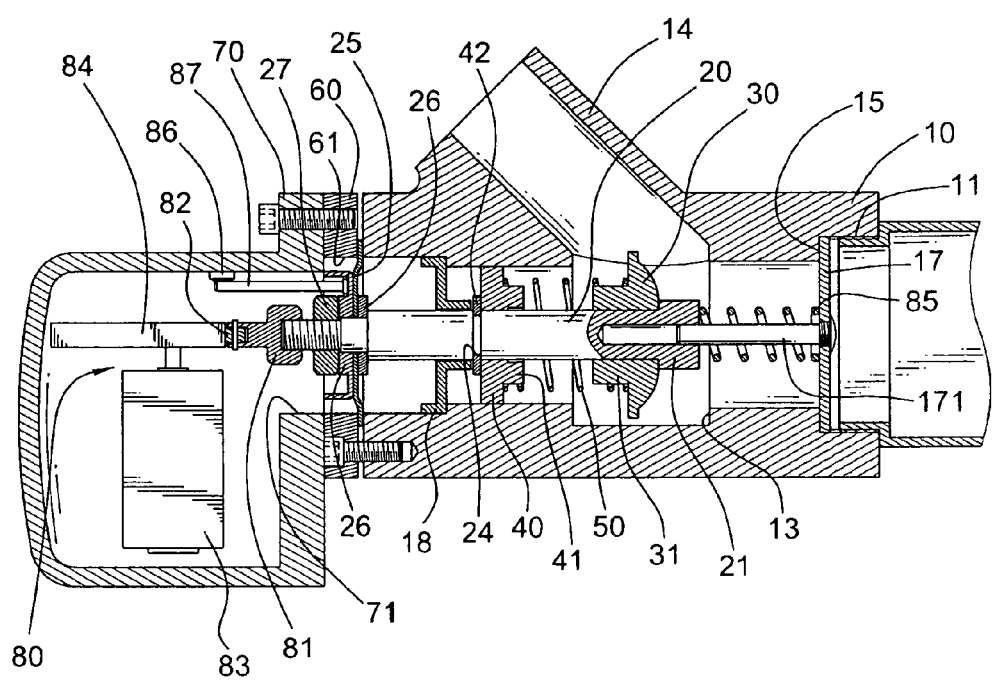
FIG. 3 is an operational side view in partial section of the water flow-controlling device.
Figure 4:
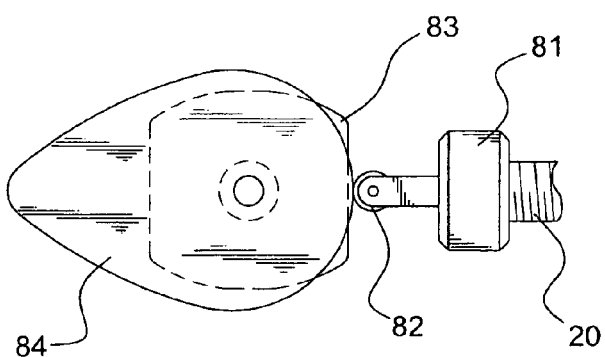
FIG. 4 is an operational partial enlarged top view of the water flow-controlling device.

The advantage of the present invention is to provide two ways to start the cooling system to cool the engine. One way to start the cooling system is by switching the motor (83) on. With further reference to FIGS. 3 and 4, the motor (83) starts to rotate the cam (84) when the temperature of the engine of the vehicle is in the standard working temperature range. The roller (82) rolls on the cam (84). The spring (85) presses the head (21) on the shaft (20) to make the roller (82) constantly abut the cam (84). The shaft (20) moves to align with the tube (10) and extends into the case (70). Then the block (30) does not obstruct the communication between the front opening (11) and the side opening (13) of the tube (10). Therefore the water from the water tank flows through the branch tube (14) into the flow route to cool the engine. The other way to start the cooling system is by the inner pressure of the engine. The inner pressure of the engine rises in accordance with the temperature of the engine. When the temperature of the engine rises unusually, the unusually high inner pressure will push the block (30) to move along the shaft (20) and to press the spring (50). Then the block (30) does not obstruct the communication between the front opening (11) and the side opening (13) of the tube (10). The water from the water tank can also flow through the branch tube (14) into the flow route to cool the engine.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A water flow-controlling device for a cooling system of a vehicle comprising
   a tube having
      an inner wall;
      a front opening;
      a rear opening communicating with the front opening;
      a side opening communicating with the front and rear openings;
      a branch tube formed on the side opening; and
      a rear bracket mounted on the inner wall near the rear opening;
   a shaft mounted movably in the rear bracket and having
      an outer wall;
      a front end;
      a rear end extending through the rear bracket; and
      a head formed on the front end;
   a block mounted movably on the shaft, selectively obstructing the communication between the front opening and the side opening of the tube and having
      a front surface abutting the head on the shaft; and
      a rear surface;
   a washer mounted securely on the shaft and having
      a front surface; and
      a rear surface;
   a spring mounted between the rear surface of the block and the front surface of the washer;
   a mounting board attached to the rear opening of the tube and having
      a through hole formed through the mounting board and communicating with the rear opening of the tube;
   a case being hollow, attached to the mounting board and having a front opening communicating with the through hole in the mounting board; and
   a reciprocating assembly mounted in the case and connecting to the shaft to move the shaft to align with the tube.

2. The water flow-controlling device as claimed in claim 1, wherein
   the shaft further has
      a thread formed on the outer wall;
      a seal mounted on the shaft near the rear end and having
         two sides; and
         two ends attached to the rear opening of the tube;
      a clamp assembly attached to the two sides of the seal to clamp the seal; and
      a fastener screwing on the thread on the shaft and attached to the clamp assembly to fasten the clamp assembly; and
   the mounting board is attached to the two ends of the seal.

3. The water flow-controlling device as claimed in claim 2, wherein
   the tube further has a front bracket mounted on the inner wall near the front opening and having a protruding rod mounted securely in the front bracket and extending toward the rear bracket;
   the head on the shaft is mounted movably around the protruding rod on the front bracket; and
   the reciprocating assembly has
      a connector mounted on the rear end of the shaft and extending into the case;
      a roller mounted rotatably on the connector;
      a motor mounted in the case;

a cam connecting to and rotated by the motor and contacting to the roller;

a spring mounted on and pressed by the front bracket and the head on the shaft;

a switch attached to the case and selectively pressed to stop the motor; and a rod attached to the seal and selectively pressing the switch.

4. The water flow-controlling device as claimed in claim 3, wherein the tube has a front shoulder formed on the inner wall near the front opening; and a rear shoulder formed on the inner wall near the rear opening;

the rear bracket is attached to the rear shoulder; and the front bracket is attached to the front shoulder.

5. The water flow-controlling device as claimed in claim 4, wherein the shaft further has a groove formed in the outer wall;

the rear surface of the washer is adjacent to the groove; and the washer further has a clip engaging the groove and attached to the rear surface of the washer.

6. The water flow-controlling device as claimed in claim 5, wherein the block further has a protrusion formed on the rear surface;

the washer further has a protrusion formed on the front surface; and the spring of the water flow-controlling device is mounted on the protrusions on the block and the washer.

7. The water flow-controlling device as claimed in claim 1, wherein the tube has a front shoulder formed on the inner wall near the front opening; and a rear shoulder formed on the inner wall near the rear opening;

the rear bracket is attached to the rear shoulder; and the front bracket is attached to the front shoulder.

8. The water flow-controlling device as claimed in claim 1, wherein the shaft further has a groove formed in the outer wall;

the rear surface of the washer is adjacent to the groove; and the washer further has a clip engaging the groove and attached to the rear surface of the washer.

9. The water flow-controlling device as claimed in claim 1, wherein the block further has a protrusion formed on the rear surface;

the washer further has a protrusion formed on the front surface; and the spring is mounted on the protrusions on the block and the washer.

\* \* \* \* \*